US000001031H

United States Statutory Invention Registration [19]

[11] Reg. Number: H1031

[43] Published: Mar. 3, 1992

Notorgiacomo, Jr.

[54] FLAME RETARDANT COMPOSITION #4

[75] Inventor: Vincent J. Notorgiacomo, Jr., Rockaway, N.J.

[73] Assignee: Shell Oil Company, Houston, Tex.

[21] Appl. No.: 496,728

[22] Filed: Mar. 21, 1990

[51] Int. Cl.[5] ..... C08K 6/03

[52] U.S. Cl. ..... 524/412

[58] Field of Search ..... 524/94, 411, 410, 412, 524/466; 525/199

[56] References Cited

U.S. PATENT DOCUMENTS

| | | | |
|---|---|---|---|
| 2,393,967 | 2/1946 | Brubaker | 260/80 |
| 2,495,286 | 1/1950 | Brubaker | 260/63 |
| 3,474,067 | 10/1969 | Praetzel et al. | 524/411 |
| 3,673,278 | 6/1972 | Bialous | 525/151 |
| 3,694,412 | 9/1972 | Nozaki | 260/63 |
| 3,975,354 | 8/1976 | Buxbaum et al. | 525/72 |
| 3,993,621 | 11/1976 | McInerney | 525/199 |
| 4,394,484 | 7/1983 | Jenkner et al. | 524/411 |
| 4,708,975 | 11/1987 | Shain | 524/94 |
| 4,761,449 | 8/1988 | Lutz | 524/424 |
| 4,786,671 | 11/1988 | Kress et al. | 524/94 |
| 4,843,144 | 6/1989 | Van Broekhoven et al. | 528/392 |
| 4,880,903 | 11/1989 | Van Broekhoven et al. | 528/392 |
| 4,885,318 | 12/1989 | Danforth et al. | 524/281 |
| 4,885,328 | 12/1989 | Danforth et al. | 525/424 |

FOREIGN PATENT DOCUMENTS

| | | |
|---|---|---|
| 121965 | 1/1984 | European Pat. Off. . |
| 181014 | 7/1985 | European Pat. Off. . |
| 222454 | 4/1986 | European Pat. Off. . |
| 257663 | 7/1987 | European Pat. Off. . |
| 1081304 | 6/1967 | United Kingdom . |

*Primary Examiner*—Richard D. Lovering
*Assistant Examiner*—Joseph D. Anthony

[57] ABSTRACT

Flame retardant compositions comprise linear alternating polymers of carbon monoxide and at least one ethylenically unsaturated hydrocarbon and a minor quantity, relative to the polymer, of antimony oxide, brominated polystyrene and polytetrafluoroethylene resin.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLAME RETARDANT COMPOSITION #4

FIELD OF THE INVENTION

Compositions comprising carbon monoxide/ethylenically unsaturated hydrocarbon polymers and certain flame retardants demonstrate improved flame retardancy.

BACKGROUND OF THE INVENTION

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical catalysts such as benzoyl peroxide. British Patent 1,081,304 produced such polymers of higher carbon monoxide content in the presence of alkylphosphine complexes of palladium as catalyst. Nozaki extended the process to arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production. Such methods are shown by European patent applications 181,014, 121,965, 222,454 and 257,663. The disclosed processes employ, inter alia, a compound of a Group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink and parts for the automotive industry or structural members for use in the construction industry.

With regard to any plastic material employed in a public application, some concern must be shown for the consequences of the material catching fire and burning. Many plastics, e.g., polyvinylchloride, produce highly toxic gases upon combustion. The use of polyketones has advantages in this regard since only atoms of carbon, hydrogen and oxygen are present in the polymer molecule. Nevertheless, it would be of advantage to provide for flame retardant compositions of polyketone polymers.

Others in the past have attempted to improve the flame retardancy of polyketone compositions. For example, U.S. Pat. No. 4,761,449 discloses compositions containing a carbon monoxide/ethylenically unsaturated hydrocarbon copolymer with an alkaline earth metal carbonate, such as calcium carbonate. While these compositions show improved flame retardancy they still have certain deficiencies. In particular, the compositions containing up to 25% calcium carbonate still have Limiting Oxygen Index (LOI) values of only 27–27.5. LOI values of 30 or greater are required for many commercial applications. In addition, the mechanical properties of the flame retardant compositions must remain high if the compositions are to have commercial significance. Therefore, it is important that the amount of flame retardant necessary to obtain commercial compositions be as small as possible.

SUMMARY OF THE INVENTION

This invention relates to flame-retardant compositions of linear alternating polymers of carbon monoxide and at least one ethylenically unsaturated hydrocarbon.

More particularly, the invention relates to compositions of such polymers incorporating a) a flame retardant amount of a flame retardant additive comprising antimony oxide and brominated polystyrene, and b) an amount of polytetrafluoroethylene resin sufficient to render the composition non-dripping.

Copending Patent Applications

U.S. Pat. No. 4,885,328 filed Mar. 31, 1989, (title "Flame Retardant Compositions") discloses and claims a flame retardant composition comprising a polyketone polymer and certain alkaline earth metal hydroxides, such as magnesium hydroxides.

Copending U.S. patent application Ser. No. 332,249, filed Mar. 31, 1989, (entitled "Flame Retardant Composition Containing Zinc Borate") discloses and claims a flame retardant composition with a polyketone polymer and zinc borate or barium borate.

U.S. Pat. No. 4,885,318 filed Mar. 31, 1989 (titled "Polyketone Flame Retardant Composition") discloses and claims a flame retardant composition with a polyketone polymer and various flame retardants, including antimony trioxide and decabromo diphenyloxide.

Copending U.S. patent application Ser. No. 496,722, filed Mar. 21, 1990 (titled "Flame Retardant Composition #2") discloses and claims a flame retardant composition comprising a polyketone polymer plus antimony oxide, polytetrafluoroethylene, and 1,3 bis(tetrabromophthalimide).

Copending U.S. patent application Ser. No. 556,142, filed July 23, 1990 (titled "Flame Retardant Composition #3") discloses and claims a flame retardant composition comprising a polyketone polymer plus polytetrafluoroethylene and a cyclic phosphonate ester.

Copending U.S. patent application Ser. No. 496,760, filed Mar. 21, 1990 (titled "Flame Retardant Composition #1") discloses and claims a flame retardant composition comprising a polyketone polymer plus antimony oxide, polytetrafluoroethylene, and a brominated aromatic ether.

DESCRIPTION OF THE INVENTION

The polymers from which the compositions of the invention are produced are linear alternating polymers of carbon monoxide and at least one ethylenically unsaturated hydrocarbon. Suitable ethylenically unsaturated hydrocarbons have 2 to 20 carbon atoms inclusive, preferably up to 10 carbon atoms inclusive and are wholly aliphatic such as ethylene and other $\alpha$-olefins including propylene, butene-1, octene-1 and dodecene-1 or are arylaliphatic containing an aryl substituent on an otherwise aliphatic molecule, particularly an aryl substituent on a carbon atom of the ethylenic unsaturation. Illustrative of this latter class of olefins are styrene, p-methylstyrene, m-methylstyrene and p-ethylstyrene. Preferred polyketone polymers are copolymers of carbon monoxide and ethylene or terpolymers of carbon monoxide, ethylene and a second aliphatic $\alpha$-olefin of 3 or more carbon atoms, particularly propylene.

Of particular interest are those polymers of molecular weight from about 1,000 to about 200,000, particularly those of molecular weight from about 10,000 to about 50,000, and containing substantially equimolar quantities of carbon monoxide and ethylenically unsaturated hydrocarbon.

Such polymers are typically produced by contacting the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, sulfur, arsenic or antimony. Although the scope of the polymerization is extensive, for purposes of illustration a preferred Group VIII metal compound is palladium acetate, the anion is the anion of an acid selected from trifluoroacetic acid and para-toluenesulfonic acid and the bidentate ligand is selected from 1,3-bis(diphenylphosphino)propane and 1,3-bis[di(2-methoxyphenyl)phosphino]propane.

Polymerization is carried out at polymerization conditions, typically at elevated temperature and pressure, in the gaseous phase or in the liquid phase in the presence of an inert diluent, e.g., a lower alkanol such as methanol or ethanol. The reactants are contacted by conventional methods such as stirring or shaking and subsequent to reaction the polymer product is recovered as by decantation or filtration. The polymer product may contain metallic residues from the catalyst which are removed by contact with a solvent which is selective for the residues. Production of these polymers is illustrated, for example, by published European patent applications 181,014, 121,965, 222,454 and 257,663.

The physical properties of the polymer will be determined in part by the molecular weight and by whether the polymer is a copolymer or a terpolymer. Typical melting points are from about 175° C. to about 300° C., more typically from about 210° C. to about 280° C. The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, e.g., a hydrocarbon of at least 3 carbon atoms, are produced there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula $$-CO(C_2H_4)]_x[CO-(B)]_y$$

wherein B is the moiety obtained by polymerization of the second ethylenically unsaturated hydrocarbon through the ethylenic unsaturation. The $-CO(C_2H_4-$ units and the $-CO(B-$ units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y is zero and the ratio of y:x is also zero. When terpolymers are employed, i.e., y is greater than zero, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

The flame retardant compositions of the invention contain a flame retarding quantity of a flame retardant additive comprising antimony oxide and brominated polystyrene.

Exemplary antimony compounds useful in the practice of this invention include antimony trioxide ($Sb_2O_3$), antimony tetraoxide ($Sb_2O_4$), antimony pentoxide ($Sb_2O_5$) and the like with antimony trioxide being particulary preferred. The antimony trioxide used herein is the conventional or standard powdered compound.

The brominated polystyrene employed in this invention has the general formula

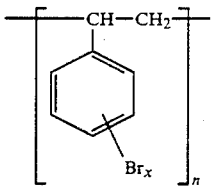

in which x is an integer of from 1 to 5 and n is an integer of 2 or more. Brominated polystyrenes having an average value of bromination degree x in a range of from 2 to 4 and polymerization degree n more than 100 are easily and industrially obtainable and suitably employed. In a preferred embodiment, tri-brominated polystryene is used, e.g. Pyro-chek 68PB from Ferro Co.

The flame retardant package is employed is an amount sufficient to render the resulting composition flame retardant. Compositions from about 2 to about 50 percent by weight, based on the total composition, of the flame retardant package are preferred. More preferred are compositions having about 10 to about 30 percent by weight of the flame retardant package.

Another component employed in the present invention is polytetrafluoroethylene resin (PTFE) as a drip suppressant. The polytetrafluoroethylene resins are commercially available or can be prepared by known processes. They are white solids obtained by polymerization of tetrafluoroethylene in aqueous media with free radical catalysts, e.g., sodium, potassium or ammonium peroxydisulfates at 100 to 1,000 psi at 0°-200° C. and preferably at 20°-100° C. as described in U.S. Pat. No. 2,393,967 which is hereby incorporated by reference. The preferred polytetrafluoroethylenes are commercially available from E. I. du Pont de Nemours and Company as Halon 650. The PTFE is used in an amount sufficient to render the composition non-dripping. Compositions from about 0.1 to about 5 percent by weight, based on the total compositions, are preferred. More preferred are compositions having about 0.3 to about 1 percent by weight of PTFE.

The following relative amounts of polymer, flame retardants and PTFE are suitable (all numbers expressed in weight percent of the total composition):

| Package | Preferred | More Preferred |
|---|---|---|
| Polyketone Polymer | about 50 to about 98% | about 60 to about 85% |
| Antimony oxide | about 1 to about 30% | about 3 to about 15% |
| Brominated polystyrene | about 2 to about 40% | about 5 to about 20% |
| PTFE | about 0.1 to about 5% | about 0.3 to about 1% |

Note, the percentages should add up to 100 percent in actual compositions.

In the package the relative amount of antimony oxide to brominated polystyrene should be in a weight ratio of 1:1 to about 1:5, preferably about 1:1 to about 1:2.5.

The flame retardants may be employed with other materials such as ammonium thiosulfate, asbestos, alkali metal carbonates or bicarbonates, e.g., potassium bicarbonate or stannous or stanic oxide. The preferred compositions of the invention, however, are those wherein the flame retardants noted above are employed as substantially the sole material used to impart flame retardancy to the polyketone composition.

In a preferred embodiment the compositions also contain a small amount of an alpha-olefin/unsaturated carboxylic acid copolymer. This copolymer is a copolymer of an alpha-olefin and an alpha,beta-ethylenically unsaturated carboxylic acid, with an optional small amount of a third monomer. The alpha-olefin/alpha,-beta-ethylenically unsaturated carboxylic acid polymer is present in an amount of from about 0.1% by weight to about 10% by weight, based on the total blend. Amounts from about 0.5% by weight to about 3% by weight on the same basis are preferred.

The alpha-olefin component of the olefin/unsaturated polymer is an alpha-olefin of up to 10 carbon atoms inclusive such as ethylene, propylene, 1-hexane, isobutylene, 1-octene or 1-decene. Preferred alpha-olefins are straight chain alpha-olefins of up to 4 carbon atoms inclusive and particularly preferred is ethylene. The alpha-olefin component of the olefin/unsaturated acid polymer is present in at least about 80% by mol, based on total copolymer, and is preferably present in a quantity of at least about 90% by mol on the same basis.

The unsaturated carboxylic acid component of the olefin/unsaturated acid polymer is preferably an alpha,-beta-ethylenically unsaturated carboxylic acid of up to 10 carbon atoms inclusive and is illustrated by acrylic acid, methacrylic acid, 2-hexanoic acid, 2-octenoic acid and 2-decenoic acid. The preferred alpha,beta-ethylenically unsaturated carboxylic acids have up to 4 carbon atoms inclusive. These are acrylic acid, methacrylic acid and crotonic acid, of which acrylic acid and methacrylic acid are preferred. The unsaturated acid component of the olefin/unsaturated acid polymer is from about 1% by mol to about 20% by mol based on total polymer. Amounts of unsaturated carboxylic acid from about 1% by mol to about 10% by mol on the same basis are preferred.

The olefin/unsaturated acid polymer is suitably a copolymer of the alpha-olefin and the alpha,beta-ethylenically unsaturated carboxylic acid and in general such copolymers are preferred. On occasion, however, it is useful to include as an optional component, a third monomer which is a non-acidic low molecular weight polymerizable monomer of up to 8 carbon atoms inclusive. Such optional third components may be other olefins, particularly other alpha-olefins such as propylene and styrene when the major alpha-olefin component is ethylene, unsaturated esters such as vinyl acetate or methyl methacrylate, unsaturated halohydrocarbons such as vinyl chloride and vinyl fluoride, and unsaturated nitriles such as acrylonitrile. The presence of a third polymerizable monomer is, as previously stated, optional and no third component is required. When a third component is present, however, amounts of third polymerizable monomer up to about 5% by mol, based on total olefin/unsaturated acid polymer, are satisfactory with amounts up to about 3% on the same basis being preferred.

A particularly useful class of ethylene-acrylic acid copolymers is marketed by Dow Chemical Company under the tradename PRIMACOR and a useful class of ethylene-methacrylic acid copolymers is marketed by DuPont Co. under the tradename NUCREL. NUCREL polymers are particularly preferred.

The flame retardant compositions are produced by mixing the flame retardants and PTFE throughout the polyketone polymer. The method of forming the composition is not critical so long as the method results in a uniform mixture of flame retardants throughout at least the outer layer of the polyketone polymer. In a preparation of a composition useful in the form in which it is produced, only the outermost portion of the composition need be provided with flame retardant. However, in most applications, a flame retardant composition is produced which is then processed further and in such applications the production of a substantially uniform mixture of polyketone polymer and flame retardant is preferred. In one modification, the compositions are produced by dry blending the components in particulate form and converting to a substantially uniform composition by application of heat and pressure. Alternatively, the compositions are produced by heating the polyketone polymer until molten and the flame retardant and PTFE thereof is mixed throughout the polymer by use of a high-shear mixer or extruder.

The polymer composition, in addition to polymer and flame retardant, may incorporate other conventional additives which do not detract from the flame retardant character of the composition. Examples of such additives are plasticizers, mold release agents and antioxidants which are added by blending or other conventional methods together with or separately from the flame retardants.

The flame retardant compositions are processed by injection molding, pressure forming or other conventional fabrication methods. They are characterized by the same combination of good impact, stiffness and heat resistant properties found in the neat polymer, and in addition have excellent flame retardancy. The compositions of this invention are useful in a variety of applications, particularly where exposure to elevated temperature is likely to be encountered. The compositions are useful in the production of parts for the automotive industry, electronics industry and electrical industry. The compositions are particularly useful for those automotive parts located within the engine compartment where high temperatures are encountered or those parts which encounter heat as during the baking of painted surfaces, e.g. wire coatings, connectors, etc.

The compositions of the invention are further illustrated by the following Comparative Examples and Illustrative Embodiments which should not be construed as limiting the invention.

COMPARATIVE EXAMPLE I

A first terpolymer (Polymer 1) of carbon monoxide, ethylene and propylene was prepared in the presence of a catalyst formed from palladium acetate, trifluoroacetic acid and 1,3-bis(diphenylphosphino)propane. The polymer had a melting point of 219° C. and a limiting viscosity number (LVN) of 1.60 measured at 60° C. in m-cresol. A second terpolymer (Polymer 2) of carbon monoxide, ethylene and propylene was prepared in the presence of a catalyst formed from palladium acetate, trifluoroacetic acid and 1,3-bis[di(2-methoxyphenyl)-phosphino]propane. The second terpolymer had a melting point of 221° C. and a LVN of 1.83 measured at 83° C. in m-cresol.

Polymer 1 was blended with different weight percents of calcium carbonate by use of a twin-screw extruder to produce nibs. Polymer 2 was also extruded to produce nibs for comparison purposes as a control without the addition of calcium carbonate. The nibs were injection molded into test bars of approximately 4.75 in. by 0.5 in. by 0.125 in. dimensions. The test bars were then sliced lengthwise into 3 equal strips and the edges were smoothed off. These strips were tested for flame retardancy.

Standar test method ASTM D2863-77 was used to evaluate the burning behavior of the different blend compositions. This test measures the minimum concentration of oxygen in an oxygen-nitrogen atmosphere that is necessary to initiate and support a flame for 180 seconds on a test strip. The result of the test is expressed as the percentage of oxygen in the oxygen-nitrogen atmosphere and is called the Limiting Oxygen Index (LOI) of the composition.

The LOI values determined for three different blends of the terpolymer and calcium carbonate are given in Table I together with the LOI of the terpolymer without added calcium carbonate used as a control sample. One can see from the LOI values in Table A that a greater percentage of oxygen was required in an oxygen-nitrogen atmosphere to initiate and support a flame on the same containing calcium carbonate in comparison to the control sample without calcium carbonate. The flame retradancy of the blend compositions is improved for the samples containing calcium carbonate, however the LOI values are still too low for most commercial applications.

TABLE I

| Sample | % Weight Calcium Carbonate | LOI* |
|---|---|---|
| Control | none | 18.5–19 |
| 1 | 5 | 23–23.5 |
| 2 | 10 | 25.5–26 |
| 3 | 25 | 27–27.5 |

*LOI values are expressed as a range obtained for three duplicate test samples.

Illustrative Embodiment I

In Illustrative Embodiment I the polyketone employed (designated Polymer 3) was a linear alternating terpolymer of carbon monoxide, ethylene and propylene prepared by employing a catalyst composition formed from palladium acetate, trifluoracetic acid and 1,3-bis[di(methoxy-phenyl)-phosphino] propane. Polymer 3 had a melting point of 220° C. and a limiting viscosity number (LVN) measured in 60° C. meta-cresol of 1.8.

The Polymer 3 composition also contained 0.5% weight Irganox 1330 antioxidant and 0.5% weight Nucrel 535 ethylene/methacrylic acid copolymer.

In Illustrative Embodiment I various bromine flame retardants were evaluated at a loading which provided a 6% wt. bromine level in the final product. The flame retardants employed are listed in Table 2 below:

TABLE 2

| Evaluated | |
|---|---|
| Flame Retardants | Chemical Name/Family |
| Pyro-Check 68PB | Tri-Brominated Polystyrene |
| DBDPE | Decabromodiphenyl Ether |
| PO-64P | Brominated Aromatic Ether |
| Saytex BT93 | 1,2 Bis(Tetrabromophthalimide) |
| Saytex BT93W | 1,2 Bis(Tetrabromophthalimide) White |
| Thermoguard 243S | Brominated Epoxy and Antimony Oxide |
| BC58 | 2,4,6 Tribromophenyl-Terminated Tetra-bromo Bisphenol A-Carbonate Oligomer |

Each formulation also contained 5.5% wt. ultra fine antimony oxide and 0.5% wt. PTFE. The conditions for compounding and molding are described below:

Compounding was done by mixing the components in a twin screw extruder having no vent and pelletizing into a water bath. Extrusion temperature was 225 to 235° C. and the RPM was 50–100.

Molding of test samples was done on a Boy 225 Molding Machine under the following conditions:

Barrel temperature—230, 240, 250° C.
Mold temperature—80° C.
Pressure—1500 psi
RPM—160
Time—15 seconds, 10 seconds cooling The results of preliminary U.L. testing and physical testing, done internally, are given in Table 3. Additional physical testing was done by another tester, and results are given in Table 4. There are minor discrepancies between these results. The values in Table 4 are probably more reliable due to the difficulties with the tensile tester used in the preliminary testing. Both tables show the same final conclusion when a blend is compared to the neat polymer control for a particular batch of runs. Four materials looked viable;

1) BC58, 2,4,6-Tribromophenyul-terminated tetrabromobisphenol A-carbonate oligomer
2) PO-64P, Brominated aromatic ether
3) Pyro-Chek 68PB, Tri-brominated polystyrene
4) Saytex BT-93W, 1,2 bis (tetrabromophthalimide)

Those four materials were further evaluated using formulations with:

A) no antimony oxide with the same amount of flame retartant
B) no antimony oxide and twice the flame retardant
C) ⅔ of the original amount of flame retardant with proportional amounts of antimony oxide and PTFE.

None of the new twelve formulations yielded products that were V-O rated.

TABLE 3

PRELIMINARY RESULTS

| ADDITIVE | FLAME RETARDANT AMOUNT % wt | BROMINE CONTENT IN POLYMER % wt | $Sb_2O_3$ AMOUNT % wt | PTFE AMOUNT % wt | 1/16" A, B | 1/32" A, B | FLEXURAL STRENGTH k psi |
|---|---|---|---|---|---|---|---|
| CO93-01-05 POLYMER 3 | 0.0 | 0 | 0.0 | 0.0 | BN, BN | BN, BN | 9.1 |
| DBDPE | 7.2 | 6 | 5.5 | 0.5 | V0, — | V1, — | 9.9 |
| BC-58 | 10.3 | 6 | 5.5 | 0.5 | V0, — | V1, — | 10.9 |
| PO-64P | 9.4 | 6 | 5.5 | 0.5 | V0, — | V0, — | 11.1 |
| BT-93 | 9.1 | 6 | 5.5 | 0.5 | V0, — | V0, — | 10.6 |
| BT-93W | 9.1 | 6 | 5.5 | 0.5 | V0, — | V0, — | 10.1 |
| CO95-01-08 | 0.0 | 0 | 0.0 | 0.0 | —, — | —, — | 7.6 |

TABLE 3-continued

PRELIMINARY RESULTS

| | | | | | | | |
|---|---|---|---|---|---|---|---|
| POLYMER 3 | | | | | | | |
| BC-58 | 10.3 | 6 | 5.5 | 0.5 | V0, V0 | V0, V0 | 10.0 |
| PO-64P | 9.4 | 6 | 5.5 | 0.5 | —, V0 | —, V0 | — |
| BT-93W | 9.1 | 6 | 5.5 | 0.5 | —, V0 | —, V0 | — |
| 68PB | 8.8 | 6 | 5.5 | 0.5 | V0, V0 | V0, V0 | 10.9 |
| 243S | 11.3 | 6 | 5.5 | 0.5 | V0, V0 | V0, V0 | 10.4 |

| ADDITIVE | FLEXURAL MODULUS kk psi | TENSILE STRENGTH k psi | ELONGATION** % | NOTCHED IMPACT ft*lb/in | COMMENTS |
|---|---|---|---|---|---|
| CO93-01-05 | 0.222 | — | — | 4.6 | NON-CONTROL |
| POLYMER 3 | | | | | |
| DBDPE | 0.296 | 8.1 | 82 | 3.8 | DEG YELLOW/BAD |
| BC-58 | 0.307 | 9.0 | 175 | 5.0 | WHITE, SLIGHT YEL DEG |
| PO-64P | 0.321 | 9.6 | 32 | 13.0+ | BROWN/NOT DEG |
| BT-93 | 0.316 | 8.2 | 57 | 4.0 | YELLOW/DEG OR PIGMENT, SMELL |
| BT-93W | 0.302 | 8.4 | 65 | 4.4 | WHITE, SLIGHT YEL DEG |
| CO95-01-08 | 0.214 | 10.1 | 157 | 4.0 | CONTROL |
| POLYMER 3 | | | | | |
| BC-58 | 0.280 | 10.5 | 119 | 3.9 | WHITE, SLIGHT YEL DEG |
| PO-64P | — | 9.3 | 30 | 9.4 | BROWN/NOT DEG |
| BT-93W | — | 9.5 | 73 | 4.0 | WHITE |
| 68PB | 0.303 | 10.2 | 80 | 8.3 | WHITE, SLIGHT YEL DEG |
| 243S | 0.313 | 11.6 | 121* | 2.7 | WHITE |

A = Condition A of UL 94, at least 48 hours at 23 deg C, 50% RH.
B = Condition B of UL 94, 70 deg C for 168 hours.
* = El % obtained by measuring distance between grips, computer failed to print out values
BN = Burned
** = Elongation values may be low due to instrument difficulties
— = Not tested, insufficient number of samples
DEG = Degraded
243S = a precompounded blend of Thermogaard 243 and antimony oxide. Straight antimony oxide was added to bring the total antimony oxide level up to 5.5% wt.

TABLE 4

PHYSICAL TESTING RESULTS

| ADDITIVE | FLAME RETARDANT AMOUNT % wt | BROMINE CONTENT IN POLYMER % wt | $Sb_2O_3$ AMOUNT % wt | PTFE AMOUNT % wt | 1/16" A, B | 1/32" A, B | FLEXURAL STRENGTH k psi |
|---|---|---|---|---|---|---|---|
| P88 | 0.0 | 0 | 0.0 | 0.0 | —, — | —, — | 7.8 |
| BC-58 | 10.3 | 6 | 5.5 | 0.5 | V0, V0 | V0, V0 | 10.4 |
| PO-64P | 9.4 | 6 | 5.5 | 0.5 | —, V0 | —, V0 | 11.4 |
| BT-93W | 9.1 | 6 | 5.5 | 0.5 | —, V0 | —, V0 | — |
| 68PB | 8.8 | 6 | 5.5 | 0.5 | V0, V0 | V0, V0 | — |
| 243S | 11.3$ | 6 | 5.5 | 0.5 | V0, V0 | V0, V0 | — |

| ADDITIVE | FLEXURAL MODULUS kk psi | TENSILE STRENGTH k psi | ELONGATION** % | NOTCHED IMPACT ft*lb/in | COMMENTS |
|---|---|---|---|---|---|
| P88 | 0.219 | 9.8 | 283 | 3.0 | CONTROL |
| BC-58 | 0.302 | 8.5 | 142 | 3.0 | WHITE, SLIGHT YEL DEG |
| PO-64P | 0.324 | 9.0 | 90 | 11.9 | BROWN/NOT DEG |
| BT-93W | — | — | — | 2.6 | WHITE |
| 68PB | — | 9.4 | 176 | 6.7 | WHITE, SLIGHT YEL DEG |
| 243S | — | — | — | — | WHITE |

What is claimed is:

1. A flame retardant polymer composition consisting essentially of a linear alternating polymer of carbon monoxide and at least one ethylenically unsaturated hydrocarbon and a) a flame retardant amount of a flame retardant additive comprising antimony oxide and brominated polystyrene, and b) an amount of polytetrafluoroethylene resin sufficient to render the composition non-dripping.

2. The composition of claim 1 wherein said polymer is a linear alternating polymer of the general formula $$-CO(C_2H_4)]_x[CO-B)]_y$$

wherein B is the moiety of an ethylenically unsaturated α-olefin of at least 3 carbon atoms polymerized through the ethylenic unsaturation and the ratio of y:x is no more than about 0.5.

3. The composition of claim 1 wherein said brominated polystyrene has the general formula

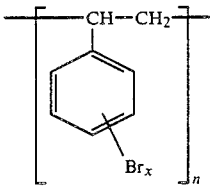

in which x is an integer from 1 to 5 and n is an integer of 2 or more.

4. The composition of claim 2 wherein said ethylenically unsaturated α-olefin is propylene.

5. The composition of claim 2 wherein said amount of flame retardant additive is about 2 to about 40 percent by weight, based on the total composition.

6. The composition of claim 2 wherein the amount of polytetrafluoroethylene is about 0.1 percent by weight to about 5 percent by weight, based on the total composition.

7. The composition of claim 3 wherein x is 3 and n is more than 100.

8. The composition of claim 5 wherein said amount of flame retardant additive is about 5 to about 20 percent by weight, based on the total composition.

9. The composition of claim 5 wherein the weight ratio of antimony oxide to brominated polystyrene is 1:1 to about 1:5.

10. The composition of claim 7 wherein said antimony oxide is antimony trioxide.

11. The composition of claim 9 wherein the amount of polytetrafluoroethylene is about 0.1 percent by weight to about 5 percent by weight, based on the total composition.

12. As an article of manufacture, a fabricated article produced from the composition of claim 1.

* * * * *